United States Patent
Koyama et al.

(10) Patent No.: US 9,447,333 B2
(45) Date of Patent: *Sep. 20, 2016

(54) AVIATION FUEL BASE OIL AND AVIATION FUEL COMPOSITION

(75) Inventors: Akira Koyama, Tokyo (JP); Tatsuo Hamamatsu, Tokyo (JP); Yasutoshi Iguchi, Tokyo (JP); Hideshi Iki, Tokyo (JP)

(73) Assignee: JX Nippon Oil & Energy Corporation, Tokyo (JP)

(*) Notice: Subject to any disclaimer, the term of this patent is extended or adjusted under 35 U.S.C. 154(b) by 463 days.

This patent is subject to a terminal disclaimer.

(21) Appl. No.: 13/130,155

(22) PCT Filed: Nov. 19, 2009

(86) PCT No.: PCT/JP2009/006223
§ 371 (c)(1),
(2), (4) Date: May 19, 2011

(87) PCT Pub. No.: WO2010/058579
PCT Pub. Date: May 27, 2010

(65) Prior Publication Data
US 2011/0219676 A1   Sep. 15, 2011

(30) Foreign Application Priority Data

Nov. 20, 2008 (JP) ................................ 2008-297116

(51) Int. Cl.
| | |
|---|---|
| C10L 1/24 | (2006.01) |
| C10L 1/26 | (2006.01) |
| C10G 3/00 | (2006.01) |
| C10L 1/04 | (2006.01) |

(52) U.S. Cl.
CPC . *C10G 3/44* (2013.01); *C10G 3/50* (2013.01); *C10L 1/04* (2013.01); *C10G 2300/1014* (2013.01); *C10G 2300/1018* (2013.01); *C10G 2300/202* (2013.01); *C10G 2400/08* (2013.01); *Y02P 30/20* (2015.11)

(58) Field of Classification Search
CPC .............. C10G 2300/1014; C10G 2300/1018; C10G 2300/202; C10G 2400/08; C10G 3/44; C10G 3/50; C10L 1/04; Y02P 30/20
USPC .......................................................... 44/435
See application file for complete search history.

(56) References Cited

U.S. PATENT DOCUMENTS

| | | | |
|---|---|---|---|
| 5,888,379 A * | 3/1999 | Ushio et al. .................. 208/210 |
| 7,232,935 B2 | 6/2007 | Jakkula et al. | |
| 7,872,165 B2 | 1/2011 | Bertoncini et al. | |
| 2006/0199984 A1 | 9/2006 | Kuechler et al. | |
| 2007/0010164 A1 | 1/2007 | Kowalski | |
| 2007/0101640 A1 | 5/2007 | Tsuto et al. | |
| 2008/0052983 A1 | 3/2008 | Aulich et al. | |
| 2008/0092436 A1 | 4/2008 | Seames et al. | |
| 2008/0173570 A1* | 7/2008 | Marchand et al. ........... 208/107 |
| 2008/0244962 A1* | 10/2008 | Abhari et al. .................. 44/308 |
| 2010/0000908 A1 | 1/2010 | Markkanen et al. | |
| 2011/0219677 A1 | 9/2011 | Koyama et al. | |

FOREIGN PATENT DOCUMENTS

| | | |
|---|---|---|
| CA | 1161775 A1 | 2/1984 |
| EP | 2130895 A1 * | 12/2009 |
| JP | 2005-154647 A | 6/2005 |
| JP | 2007-308569 A | 11/2007 |
| JP | 2007-332360 A | 12/2007 |
| JP | 2008-239876 A | 10/2008 |
| WO | 2005026297 A1 | 3/2005 |
| WO | 2007-142013 A1 | 12/2007 |
| WO | 2008084145 A2 | 7/2008 |
| WO | 2008/117856 A1 | 10/2008 |
| WO | WO 2008117856 * | 10/2008 |

OTHER PUBLICATIONS

JIS K 2209 (1991).*
Office Action issued May 30, 2014 in U.S. Appl. No. 13/130,172.
Office Action issued Nov. 8, 2013 in U.S. Appl. No. 13/130,172 by Koyama.
"The Path to a Jet Fuel Alternative: Airbus Initiatives and the Steps Ahead," ICAO Journal, vol. 63, Issue 4, pp. 22, 24, (2008).
Tadahide Sone, "Suisoka Bio Keiyu (BHD) no Seizo Gijutsu," Material Stage, vol. 7, No. 11, pp. 73-78, (2008).
Yuta Oda, "Koku Nenryo no Kiso Chishiki," Aviation Engineering, vol. 501, pp. 17-23, (1996).
Int'l Search Report issued on Dec. 15, 2009 in Int'l Application No. PCT/JP2009/006223.
EP Search Report issued Apr. 2, 2012 in EP Application No. 09827360.0.
EP Search Report issued Apr. 2, 2012 in EP Application No. 09827361.8.
Int'l. Search Report dated Dec. 15, 2009 in Int'l. Application No. PCT/JP2009/006224.
Office Action issued Nov. 25, 2014 in U.S. Appl. No. 13/130,172.
Office Action issued Aug. 13, 2015 in U.S. Appl. No. 13/130,172 by Koyama.

* cited by examiner

*Primary Examiner* — Latosha Hines
(74) *Attorney, Agent, or Firm* — Panitch Schwarze Belisario & Nadel LLP

(57) ABSTRACT

The present invention provides an environment friendly aviation fuel base oil having combustibility, oxidation stability and excellent life cycle characteristics and contributing to diversification of primary energy, which is produced by hydrotreating a feedstock comprising a mixed oil of an oxygen-containing hydrocarbon compound originating from an animal or vegetable fat and a sulfur-containing hydrocarbon compound or a feedstock comprising said mixed oil and a petroleum base oil produced by refining crude oil and an aviation fuel composition comprising the aviation fuel base oil, and an aviation fuel composition containing such an aviation fuel base oil.

6 Claims, No Drawings

AVIATION FUEL BASE OIL AND AVIATION FUEL COMPOSITION

CROSS-REFERENCE TO RELATED APPLICATION

This application is a Section 371 of International Application No. PCT/JP2009/006223, filed Nov. 19, 2009, which was published in the Japanese language on May 27, 2010, under International Publication No. WO 2010/058579 A1, and the disclosure of which is incorporated herein by reference.

TECHNICAL FIELD

The present invention relates to an aviation fuel base oil and an aviation fuel composition.

BACKGROUND ART

Attention has been focused on the effective use of biomass energies in order to prevent global warming. In particular, those originating from vegetables in particular can make effectively the use of hydrocarbons converted from carbon dioxide by photosynthesis through the growth process of the vegetables and thus have a nature so-called carbon neutral, which does not lead to an increase in carbon dioxide in the atmosphere in view of the life cycle. Biomass fuel has had a high degree of expectation as an alternative energy to petroleum from the viewpoint of depletion of petroleum resources and inflating oil prices.

The use of biomass energy has been variously studied also in the field of fuels for transportation. For example, if a fuel originating from an animal or vegetable oil can be used as diesel fuel, the fuel is expected to take an effective role in carbon dioxide emission reduction because of its synergistic effect with the high energy efficiency of a diesel engine. Examples of generally known diesel fuels using animal or vegetable oils includes fatty acid methyl ester oils (abbreviated as "FAME"). The FAME is produced by ester-exchanging triglyceride, which is a general structure of an animal or vegetable oil, with methanol with the aid of the action of an alkali catalyst. Various studies have also been carried out so as to use the FAME not only for diesel fuel but also for aviation fuel, i.e., jet fuel. Aircrafts spent enormous amounts of fuel and have been affected largely by the recent inflating oil prices. Under these circumstances, much attention has been paid to biomass fuel as an important item taking a role not only as a measure for preventing global warming but also as fuel alternative to petroleum. Currently, the use of the FAME in the form of a mixture with a petroleum-based jet fuel has been carried out in some airline companies although on a trial basis.

However, it is necessary to dispose of glycerin produced as a by-product during the process of producing the FAME as described in Patent Literature 1 below. Costs and energies are also required to clean the resulting oil.

Furthermore, the FAME has concerns about its low temperature performances and oxidation stability. Since aviation fuels in particular are exposed to extremely low temperatures during flight at high altitudes, they are required to satisfy highly strict low temperature performance standards. When the FAME is to be used, it is very much a situation that the FAME must be blended with petroleum-based jet fuel and the amount of the FAME must be small. For oxidation stability, the specification of aviation fuel has established the addition of antioxidants. However, when consideration is given to the stability of the base oil, the amount thereof must be small as well as for low temperature performance.

CITATION LIST

Patent Literatures

Patent Literature 1: Japanese Patent Application Laid-Open Publication No. 2005-154647

SUMMARY OF INVENTION

Technical Problem

The present invention intends to solve the foregoing problems and has an object to provide an aviation fuel base oil having excellent combustibility, oxidation stability and life cycle characteristics and an aviation fuel composition containing such an base oil.

Solution to Problem

The present invention has been accomplished on the basis of the results of extensive studies carried out the inventors to solve the above problems.

That is, the present invention relates to an aviation fuel base oil produced by hydrotreating a feedstock comprising a mixed oil of an oxygen-containing hydrocarbon compound originating from an animal or vegetable fat and a sulfur-containing hydrocarbon compound or a feedstock comprising the mixed oil and a petroleum base oil produced by refining crude oil.

The present invention also relates to the foregoing aviation fuel base oil, wherein the hydrotreating comprises a step wherein the feedstock is hydrotreated in the presence of hydrogen using a catalyst comprising a porous inorganic oxide comprising two or more types of elements selected from aluminum, silicon, zirconium, boron, titanium and magnesium and one or more types of metals selected from the group consisting of the Groups 6A and 8 elements of the periodic table, supported thereon, under conditions where the hydrogen pressure is from 2 to 13 MPa, the liquid hourly space velocity is from 0.1 to 3.0 h$^{-1}$, the hydrogen/oil ratio is from 150 to 1500 NL/L, and the reaction temperature is from 150 to 480° C.

The present invention also relates to any of the forgoing aviation fuel base oils, wherein the hydrotreating comprises a step wherein the hydrotreated oil produced in the hydrotreating step is further isomerized in the presence of hydrogen using a catalyst comprising a porous inorganic oxide comprising two or more types of elements selected from aluminum, silicon, zirconium, boron, titanium, magnesium and zeolite and one or more types of metals selected from the group consisting of the Group 8 elements of the periodic table, supported thereon, under conditions where the hydrogen pressure is from 2 to 13 MPa, the liquid hourly space velocity is from 0.1 to 3.0 h$^{-1}$, the hydrogen/oil ratio is from 250 to 1500 NL/L, and the reaction temperature is from 150 to 380° C.

The present invention also relates to an aviation fuel composition comprising any of the foregoing aviation fuel base oils.

The present invention also relates to an aviation fuel composition comprising any of the foregoing aviation fuel base oils and an aviation fuel base oil produced by refining crude oil.

The present invention also relates to any of the foregoing aviation fuel compositions, further comprising one or more additives selected from an antioxidant, an antistatic, a metal deactivator, and an anti-icing agent.

The present invention also relates to any of the foregoing aviation fuel compositions, wherein the composition satisfies the standard value defined by JIS K2209 "Aviation turbine fuels".

Advantageous Effects of Invention

The present invention provides an environment friendly aviation fuel base oil having excellent combustibility, oxidation stability and lifecycle characteristics resulting from its carbon neutral characteristics and can contribute to primary energy diversification and also an aviation fuel composition comprising such a base oil.

BEST MODE FOR CARRYING OUT THE INVENTION

The present invention will be described in detail below.

In the present invention, there is used a feedstock comprising a mixed oil of an oxygen-containing hydrocarbon compound originating from an animal or vegetable fat and a sulfur-containing hydrocarbon compound or a feedstock comprising this mixed oil and a petroleum base oil produced by refining crude oil.

Examples of the animal or vegetable fat include beef tallow, rapeseed oil, soy bean oil, and palm oil. Any fat may be used as the animal or vegetable fat in the present invention. Alternatively, waste oils resulting from the use of these fats may be used. However, in view of carbon neutral, it is preferable to use vegetable fats. In view of the yield of kerosene fraction after hydrotreating, it is preferable to use vegetable fats wherein the total of structural ratio (fatty acid composition) of fatty acid groups each having a fatty acid carbon chain of 10 to 14 is 60 percent by mass or more. Preferable vegetable fats that can be thought from this viewpoint are coconut oil and palm oil. These fats may be used alone or in combination.

The fatty acid composition is a value determined in accordance with Standard Test Method of Analysis of Oils and Fats (established by Japan Oil Chemists' Society) (1993) "2.4.21.3-77 Fatty Acid Composition (FID Programmed Temperature Gas Chromatograph Method)" using a programmed temperature gas chromatograph equipped with a flame ionization detector (FID) from methyl ester prepared in accordance with Standard Test Method of Analysis of Oils and Fats (established by Japan Oil Chemists' Society) (1991) "2.4.20.2-91 Method for Preparing Fatty Acid Methyl Ester (Boron Trifluoride-Methanol Method)", and refers to a constitutive ratio (mass %) of each fatty acid group constituting the fat.

In general, an oxygen-containing hydrocarbon compound originating from an animal or vegetable fat is a compound having a fatty acid triglyceride structure but may contain other fatty acids or oxygen-containing hydrocarbon compounds modified to ester bodies, such as fatty acid methyl ester. However, the vegetable fat preferably contains mainly a component having a triglyceride structure with the objective of reducing carbon dioxide emissions because carbon dioxide is generated upon production of fatty acids or fatty acid esters from vegetable fats. In the present invention, the ratio of the compound having a triglyceride structure in the oxygen-containing hydrocarbon compound contained in the feedstock is preferably 90 percent by mole or more, more preferably 92 percent by mole or more, more preferably 95 percent by mole or more.

No particular limitation is imposed on the sulfur-containing hydrocarbon compound also contained in the feedstock. However, specific examples include sulfide, disulfide, polysulfide, thiol, thiophene, benzothiophene, dibenzothiophene, and derivatives thereof. The sulfur-containing hydrocarbon compound contained in the feedstock may be a single compound or a mixture of two or more types of these compounds. Alternatively, a petroleum hydrocarbon fraction containing sulfur may be used as the sulfur-containing hydrocarbon compound.

The sulfur content of the feedstock is preferably 1 to 50 ppm by mass, more preferably 5 to 30 ppm by mass, more preferably 10 to 20 ppm by mass in terms of sulfur on the basis of the total mass of the feedstock. If the sulfur content in terms of sulfur is less than 1 ppm by mass, it tends to be difficult to maintain stable deoxidization activity. If the sulfur content is in excess of 50 ppm by mass, the sulfur concentration of the light gas exhausted during hydrorefining process will be increased. Furthermore, the hydrorefined oil is likely to be increased in sulfur content and thus would adversely affect the exhaust gas purification device of a diesel engine when it is used therefor. The sulfur content used herein denotes the mass content of sulfur measured in accordance with JIS K 2541 "Determination of sulfur content" or the method described in ASTM-5453.

The sulfur-containing hydrocarbon compound contained in the feedstock may be mixed with the oxygen-containing hydrocarbon compound originating from an animal or vegetable fat beforehand and then introduced into a reactor of a hydrotreating unit or alternatively may be supplied to a section upstream the reactor when the oxygen-containing hydrocarbon compound originating from an animal or vegetable is introduced therein.

Alternatively, the feedstock may further contain a petroleum-based base oil produced by refining crude oil in addition to the mixed oil of the oxygen-containing hydrocarbon compound originating from an animal or vegetable fat and the sulfur-containing hydrocarbon compound.

Examples of the petroleum-based base oil produced by refining crude oil include fractions produced by atmospheric- or vacuum-distilling crude oil and fractions produced through reactions such as hydrodesulfurizatin, hydrocracking, fluid catalytic cracking, and catalytic reforming. These fractions may be contained alone or in combination as long as the sulfur content of the feedstock is within the above-described predetermined range. Furthermore, the petroleum-based base oil produced by refining crude oil may be a compound originating from chemical products or a synthetic oil produced through a Fischer-Tropsch reaction.

No particular limitation is imposed on the content ratio of the petroleum-based base oil produced by refining crude oil, in the feedstock. However, the ratio is preferably from 20 to 70 percent by volume, more preferably from 30 to 60 percent by volume.

The aviation fuel base oil of the present invention may be prepared by hydrotreating the above-described feedstock.

Preferably, hydrotreating contains the following hydrotreating steps. In the present invention, hydrotreating is carried out preferably under conditions where the hydrogen pressure is in the range of 2 to 13 MPa, the liquid hourly space velocity (LHSV) is in the range of 0.1 to 3.0 h$^{-1}$ and the hydrogen/oil ratio is in the range of 150 to 1500 NL/L, more preferably under conditions where the hydrogen pressure is in the range of 2 to 13 MPa, the liquid hourly space velocity is in the range of 0.1 to 3.0 h$^{-1}$, and the hydrogen/oil ratio is in the range of 150 to 1500 NL/L, more preferably under conditions where the hydrogen pressure is in the range of 3 to 10.5 MPa, the liquid hourly space velocity is in the range of 0.25 to 1.0 h$^{-1}$, and the hydrogen/oil ratio is in the range of 300 to 1000 NL/l.

Each of the conditions is a factor exerting an influence on the reaction activity. For example, if the hydrogen pressure and hydrogen/oil ratio are less than the lower limits, the reactivity tends to reduce, and the activity tends to reduce rapidly. If the hydrogen pressure and hydrogen/oil ratio exceed the upper limits, an enormous plant investment for a compressor may be required. Lower liquid hourly space velocity tends to be more advantageous for the reactions. However, if the liquid hourly space velocity is lower than the lower limit, an enormous plant investment for construction of a reactor with an extremely large volume may be required. If the liquid hourly space velocity exceeds the upper limit, the reaction tends to proceed insufficiently.

The reaction temperature can be arbitrarily adjusted so as to obtain the intended decomposition rate of the heavy fraction of the feedstock or the intended fraction yield. The average temperature in the whole reactor is set to generally from 150 to 480° C., preferably from 200 to 400° C., more preferably from 260 to 360° C. If the reaction temperature is lower than 150° C., the reaction would not proceed sufficiently. If the reaction temperature exceeds 480° C., excessive decomposition would proceed and the yield of the liquid product would be reduced.

The catalyst for hydrotreating is a catalyst comprising a porous inorganic oxide comprising two or more types of elements selected from aluminum, silicon, zirconium, boron, titanium and magnesium and one or more types of metals selected from the group consisting of the Groups 6A and 8 elements of the periodic table, supported thereon.

The support of the hydrotreating catalyst is a porous inorganic oxide containing two or more elements selected from aluminum, silicon, zirconium, boron, titanium and magnesium. The support is generally an alumina-containing porous inorganic oxide. Examples of other components constituting the support include silica, titania, zirconia, boria and magnesia. The support is preferably a composite oxide containing alumina and at least one or more components selected from the other constituting components. The support may further contain phosphorus in addition to these components. The total content of the components other than alumina is preferably from 1 to 20 percent by mass, more preferably 2 to 15 percent by mass. If the total content is less than 1 percent by mass, the resulting catalyst fails to obtain a sufficient catalytic surface area and thus would be reduced in activity. If the total content is more than 20 percent by mass, the acidic properties of the support are increased, possibly leading to a reduction in activity caused by the formation of coke. When phosphorus is contained as a support constituting component, the content of phosphorus is from 1 to 5 percent by mass, more preferably from 2 to 3.5 percent by mass in terms of oxide.

No particular limitation is imposed on the raw materials that are precursors of silica, titania, zirconia, boria and magnesia that are the support constituting components other than alumina. Therefore, a solution containing silicon, titanium, zirconium, boron or magnesium is generally used. For silicon, silicic acid, sodium silicate, and silica sol may be used. For titanium, titanium sulfate, titanium tetrachloride, and various alkoxide salts may be used. For zirconium, zirconium sulfate and various alkoxide salts may be used. For boron, boric acid may be used. For magnesium, magnesium nitrate may be used. For phosphorus, phosphoric acid and alkali metal salts thereof may be used.

The raw materials of these support constituting components other than alumina are preferably added at any stage prior to calcination of the support. For example, the raw materials may be added to an aluminum aqueous solution which is then formed into an aluminum hydroxide gel containing these support constituting components, or may be added to a prepared aluminum hydroxide gel. Alternatively, the raw materials may be added at a step of kneading a mixture of water or an acid aqueous solution and a commercially available alumina intermediate or boehmite powder. Preferably, these support constituting components are contained in an aluminum hydroxide gel during the process of preparation thereof. Although the mechanism exhibiting advantageous effects attained by addition of these support constituting components other than alumina has not been elucidated, it is assumed that these components form a complex oxide state together with aluminum. It is thus presumed that this increase the surface area of the support and cause some interaction with the active metals, thereby giving influences to the activity of the catalyst.

The catalyst for hydrotreating contains at least one metal, preferably two or more metals selected from the Groups 6A and 8 metals of the periodic table, as an active metal. Examples of such metals include Co—Mo, Ni—Mo, Ni—Co—MO, and Ni—W. Upon hydrotreating, these metals are converted to be in the form of sulfides before being used.

The total supported amount of the active metals, for example, W and Mo is preferably from 12 to 35 percent by mass, more preferably from 15 to 30 percent by mass, in terms of oxide, of the catalyst mass. If the amount is less than 12 percent by mass, the catalytic activity would be reduced because the number of active sites is reduced. If the amount is more than the upper limit, the metals fail to disperse effectively, possibly leading to a reduction in catalytic activity. The total supported amount of Co and Ni is preferably from 1.5 to 10 percent by mass, more preferably from 2 to 8 percent by mass, in terms of oxide, of the catalyst mass. If the amount is less than 1.5 percent by mass, a sufficient co-catalytic effect can not be attained, possibly leading to a reduction in catalytic activity. If the amount is more than 10 percent by mass, the metals fail to disperse effectively, possibly leading to a reduction in catalytic activity.

No particular limitation is imposed on the method of supporting the active metals on any of the above-described hydrotreating catalysts. Therefore, any conventional method for producing a usual desulfurization catalyst may be employed. A method is preferably employed in which a support is impregnated with a solution containing salts of the active metals. Alternatively, an equilibrium adsorption method, pore-filling method, or incipient-wetness method is also preferably used. For example, the pore-filling method is a method in which the pore volume of a support is measured in advance, and then the support is impregnated with the same volume of a metal salt solution. There is no particular restriction on the method of impregnating the support with a solution. Therefore, any suitable method may be used depending on the amount of the metals to be supported and physical properties of the support.

The reactor for hydrotreating may be of a fixed bed mode. That is, supply of hydrogen to the feedstock may be carried out in the form of counter flow or parallel flow. Alternatively, counter flow and parallel flow may be combined in a plurality of reactors. The supply mode of the feedstock is generally down flow. Gas-liquid cocurrent flow may be employed. Furthermore, a single reactor is used alone or a plurality of reactors may be used in combination. A single reactor with the interior segmented into a plurality of catalyst beds may also be employed. In the present invention, the hydrotreated oil resulting from hydrotreatment in the reactor is fractionated into predetermined fractions through gas-liquid separation and rectification. A gas-liquid separation device or any other by-produced gas removal device may be installed between the plurality of reactors or in the product recovering step in order to remove water generated in associated with the reaction and by-produced gas such as carbon monoxide, carbon dioxide, and hydrogen sulfide. Examples of the by-produced gas removal device include high pressure separators and the like.

Hydrogen gas is generally introduced into a first reactor via its inlet, accompanying the feedstock, before or after the feedstock passes through a heating furnace. Alternatively, hydrogen gas may be introduced from the spaces between the catalyst beds or between a plurality of reactors for the purposes of controlling the temperature in the reactors and maintaining the hydrogen pressure over the whole reactors as much as possible. Hydrogen to be introduced in such a manner is referred to as "quenching hydrogen". The ratio of the quenching hydrogen to the hydrogen introduced, accompanying the feedstock is preferably from 10 to 60 percent by volume, more preferably from 15 to 50 percent by volume. The ratio of less than 10 percent by volume would cause a tendency that the reaction at reaction sites in the subsequent stages does not proceed sufficiently. The ratio in excess of 60 percent by volume would cause a tendency that the reaction near the inlet of the reactor does not proceed sufficiently.

In the process of producing the aviation fuel base oil of the present invention, a specific amount of a recycled oil may be incorporated in the feedstock to reduce the amount of heat generated in the hydrotreating reactor upon hydrotreating of the feedstock. The amount of the recycled oil is from 0.5 to 5 times by mass of the oxygen-containing hydrocarbon compound originating from an animal or vegetable fat and may be adjusted appropriately within this range depending on the maximum operation temperature in the hydrotreating reactor. This is because on assumption that the specific heats of both the recycle oil and the oxygen-containing hydrocarbon compound are the same, the temperature increase upon they are mixed at 1:1 is half of that of the case where only substances originating from animal or vegetable fats are reacted, and thus the reaction temperature can be sufficiently lowered if the amount of the recycled oil is within the above range. The recycled oil in excess of 5 times by mass of the oxygen-containing compound would reduce the concentration thereof, resulting in a reduction in reactivity and would increase the flow rate in piping, resulting in an increase in load. When the content of the recycled oil is less than 0.5 times by mass of the oxygen-containing compound, a rise in temperature can not be suppressed sufficiently.

No particular limitation is imposed on the method of mixing the feedstock and the recycled oil. For example, they are mixed in advance and introduced into a reactor of a hydrotreating unit. Alternatively, the recycled oil may be introduced at a prior stage of the reactor when the feedstock is introduced thereinto. Further alternatively, they may be introduced into the spaced between a plurality of reactors connected in series or between the catalyst layers formed by dividing the catalyst layer in a single reactor.

Preferably, the recycled oil contains a portion of a hydrotreated oil produced by hydrotreating the feedstock and then removing by-products such as water, carbon monoxide, carbon dioxide, and hydrogen sulfide. Furthermore, the recycled oil preferably contains a portion of a product produced by isomerizing each of a light fraction, a middle fraction, and a heavy fraction, fractionated from the hydrotreated oil or a portion of a middle fraction fractionated from a product produced by isomerizing the hydrotreated oil.

The hydrotreating used in the present invention may further contain a step of isomerizing the hydrotreated oil produced through the above-described hydrotreating step.

The sulfur content of the hydrotreated oil that is a feedstock of isomerization is preferably 1 ppm by mass or less, more preferably 0.5 ppm by mass. A sulfur content of greater than 1 ppm by mass would possibly prevent the progress of hdyroisomerization. Additionally, for the same reason, the sulfur content of a reaction gas containing hydrogen to be introduced together with the hydrotreated oil is necessarily low sufficiently and preferably 1 ppm by volume or less, more preferably 0.5 ppm by volume or less.

The isomerization treatment is carried out in the presence of hydrogen preferably under conditions where the hydrogen pressure is from 2 to 13 MPa, the liquid hourly space velocity is from 0.1 to 3.0 $h^{-1}$, and the hydrogen/oil ratio is from 250 to 1500 NL/L, more preferably under conditions where the hydrogen pressure is from 2.5 to 10 MPa, the liquid hourly space velocity is from 0.5 to 2.0 $h^{-1}$, and the hydrogen/oil ratio is from 380 to 1200 NL/L, more preferably under conditions where the hydrogen pressure is from 3 to 8 MPa, the liquid hourly space velocity is from 0.8 to 1.8 $h^{-1}$, and the hydrogen/oil ratio is from 350 to 1000 NL/L.

Each of the conditions is a factor exerting an influence on the reaction activity. For example, if the hydrogen pressure and hydrogen/oil ratio are less than the lower limits, the reactivity tends to reduce, and the activity tends to reduce rapidly. If the hydrogen pressure and hydrogen/oil ratio exceed the upper limits, an enormous plant investment for a compressor may be required. Lower liquid hourly space velocity tends to be more advantageous for the reactions. However, if the liquid hourly space velocity is lower than the lower limit, an enormous plant investment for construction of a reactor with an extremely large volume may be required. If the liquid hourly space velocity exceeds the upper limit, the reaction tends to proceed insufficiently.

The reaction temperature can be arbitrarily adjusted so as to obtain the intended decomposition rate of the heavy fraction of the feedstock or the intended fraction yield. The reaction temperature is preferably from 150 to 380° C., more preferably from 240 to 380° C., more preferably from 250 to 365° C. If the reaction temperature is lower than 150° C., the reaction would not proceed sufficiently. If the reaction temperature exceeds 380° C., excessive cracking or other side reactions would proceed, possibly resulting in a reduction in the liquid product yield.

The catalyst for isomerization is a catalyst comprising a porous inorganic oxide comprising a substance selected from aluminum, silicon, zirconium, boron, titanium, magnesium, and zeolite and one or more types of metals selected from the group consisting of the Group 8 elements of the periodic table, supported thereon.

Examples of the porous inorganic oxide used as the support of the catalyst for isomerization include alumina, titania, zirconia, boria, silica, and zeolite. In the present invention, the support is preferably composed of alumina and at least one type selected from titania, zirconia, boria, silica, and zeolite. No particular limitation is imposed on the method of producing the support. Therefore, there may be employed any method using raw materials in the form of sols or salt compounds each containing any of the elements. Alternatively, the support may be prepared by forming a complex oxide or hydroxide such as silica alumina, silica zirconia, alumina titania, silica titania, and alumina boria and then adding at any step alumina in the form of alumina gel, a hydroxide, or a suitable solution. Alumina can be contained in any percentage to other oxides on the basis of the porous support. However, the content of alumina is preferably 90 percent by mass or less, more preferably 60 percent by mass or less, more preferably 40 percent by mass or less, and preferably 10 percent by mass or more, more preferably 20 percent by mass or more, of the support mass.

Zeolite is a crystalline alumino silicate. Examples of the crystalline structure include faujasite, pentasil, and mordenite. These zeolites may be those ultra-stabilized by a specific hydrothermal treatment and/or acid treatment or those whose alumina content is adjusted. Preferred zeolites are those of faujasite and mordenite types, and particularly preferred zeolites are those of Y and beta types. The zeolites of Y type are preferably ultra-stabilized. The ultra-stabilized zeolite have a micro porous structure peculiar thereto, so-called micro pores of 20 Å or smaller and also newly formed pores in the range of 20 to 100 Å. The hydrothermal treatment may be carried out under known conditions.

The active metal of the catalyst for isomerization is one or more metals selected from the group consisting of the Group 8 elements of the periodic table. Among these metals, the active metal is preferably one or more metals selected from Pd, Pt, Rh, Ir, Au, and Ni and more preferably a combination thereof. Preferable combinations include Pd—Pt, Pd—Ir, Pd—Rh, Pd—Au, Pd—Ni, Pt—Rh, Pt—Ir, Pt—Au, Pt—Ni, Rh—Ir, Rh—Au, Rh—Ni, Ir—Au, Ir—Ni, Au—Ni, Pd—Pt—Rh, Pd—Pt—Ir, and Pt—Pd—Ni. More preferable combinations include Pd—Pt, Pd—Ni, Pt—Ni, Pd—Ir, Pt—Rh, Pt—Ir, Rh—Ir, Pd—Pt—Rh, Pd—Pt—Ni, and Pd—Pt—Ir. Further more preferable examples include Pd—Pt, Pd—Ni, Pt—Ni, Pd—Ir, Pt—Ir, Pd—Pt—Ni, and Pd—Pt—Ir.

The content of the active metal(s) is preferably from 0.1 to 2 percent by mass, more preferably from 0.2 to 1.5 percent by mass, more preferably from 0.5 to 1.3 percent by mass in terms of metal on the basis of the catalyst mass. If the total content is less than 0.1 percent by mass, the catalytic activity would be reduced because the number of active sites is reduced. If the total content is more than 2 percent by mass, the metals fail to disperse effectively, possibly resulting in an insufficient catalytic activity.

No particular limitation is imposed on the method of supporting the active metals on any of the catalysts for isomerization. Therefore, any conventional method for producing a usual desulfurization catalyst may be employed. A method is preferably employed in which a support is impregnated with a solution containing salts of the active metals. Alternatively, an equilibrium adsorption method, pore-filling method, or incipient-wetness method is also preferably used. For example, the pore-filling method is a method in which the pore volume of a support is measured in advance, and then the support is impregnated with the same volume of a metal salt solution. No particular limitation is imposed on the method of impregnating the support with a solution. Therefore, any suitable method may be used depending on the amount of the metals to be supported and physical properties of the support.

The isomerization catalyst used in the present invention is preferably used after the active metal(s) contained therein has been subjected to a reduction treatment before put in use in the reaction. No particular limitation is imposed on the conditions for the reduction treatment. However, the active metal(s) are reduced by being subjected to a treatment at a temperature of 200 to 400° C., preferably 240 to 380° C. under hydrogen current. It the reduction temperature is lower than 200° C., reduction of the active metal (s) may not proceed sufficiently, and thus the resulting catalyst may not exhibit hydrodeoxidization or hydroisomerization activity. If the reduction temperature is higher than 400° C., agglomeration of the active metal(s) proceeds and thus similarly the resulting catalyst may not exhibit the activities.

The reactor for isomerization may be of a fixed bed mode. That is, supply of hydrogen to the feedstock may be carried out in the form of counter flow or parallel flow. Alternatively, counter flow and parallel flow may be combined in a plurality of reactors. The supply mode of the feedstock is generally down flow. Gas-liquid cocurrent flow may be employed. Furthermore, a single reactor is used alone or a plurality of reactors may be used in combination. A single reactor with the interior segmented into a plurality of catalyst beds may also be employed.

Hydrogen gas is generally introduced into a first reactor via its inlet, accompanying the feedstock, before or after the feedstock passes through a heating furnace. Alternatively, hydrogen gas may be introduced from the spaces between the catalyst beds or between a plurality of reactors for the purposes of controlling the temperature in the reactors and maintaining the hydrogen pressure over the whole reactors. Hydrogen to be introduced in such a manner is referred to as "quenching hydrogen". The ratio of the quenching hydrogen to the hydrogen introduced, accompanying the feedstock is preferably from 10 to 60 percent by volume, more preferably from 15 to 50 percent by volume. The ratio of less than 10 percent by volume would cause a tendency that the reaction at reaction sites in the subsequent stages does not proceed sufficiently. The ratio in excess of 60 percent by volume would cause a tendency that the reaction near the inlet of the reactor does not proceed sufficiently.

If necessary, the isomerized oil resulting from the isomerization may be fractionated into a plurality of fractions in a rectification tower. For example, the isomerized oil may be fractionated into a light fraction such as gas and naphtha fraction, a middle fraction such as kerosene and gas oil fractions, and a heavy fraction such as residues. In this case, the cut temperature between the light fraction and the middle fraction is preferably from 100 to 200° C., more preferably from 120 to 180° C., more preferably from 120 to 160° C., more preferably from 130 to 150° C. The cut temperature between the middle fraction and the heavy fraction is preferably from 250 to 360° C., more preferably from 250 to 320° C., more preferably from 250 to 300° C., more preferably from 250 to 280° C. Such a light hydrocarbon fraction thus generated may be partially reformed in a steam reforming unit thereby producing hydrogen. Hydrogen thus produced has carbon neutral characteristics and thus can reduce environment load because the feedstock used in the steam reforming is a biomass-originating hydrocarbon. The middle fraction produced by fractionating the isomerized oil can be suitably used as an aviation fuel base oil.

The aviation fuel base oil of the present invention may be used alone as an aviation fuel but may be mixed with an aviation fuel base oil produced by refining crude oil in the form of an aviation fuel composition. Examples of the aviation fuel base oil produced by refining crude oil include aviation fuel fractions produced through a general petroleum refining process and a synthetic fuel base oil produced through a Fischer-Tropsch reaction or the like using synthetic gas composed of hydrogen and carbon monoxide. This synthetic fuel base oil is characterized in that it does not contain almost no aromatic but contains a saturated hydrocarbon as the main component and has a high smoke point. No particular limitation is imposed on the method of producing the synthetic gas. Any conventional method may be used.

The aviation fuel composition of the present invention may be blended with various additives that have been conventionally added to an aviation fuel. Examples of these additives include one or more additive selected form an antioxidant, an antistatic, a metal deactivator, and an anti-icing agent.

Examples of the antioxidant include a mixture of 75 percent or more of N,N-diisopropylparaphenylenediamine and 2,6-di-tertiary-butylphenol and 25 percent or less of tertiary and tritertiary butylphenol, a mixture of 72 percent or more of 2,4-dimethyl-6-tertiary-butylphenol and 28 percent or less of monometyl and dimethyl tertiary butylphenol, a mixture of 55 percent or more of 2,4-dimethyl-6-tertiary-butylphenol and 45 percent of less of tertiary and tritertiary butylphenol, and 2,6-ditertiary-butyl-4-methylphenol. These antioxidants may be added in an amount of not exceeding 24.0 mg/l in order to prevent the generation of gum in the aviation fuel composition The antistatic, which may be STADIS 450 manufactured by Octel Corporation is added not exceeding 3.0 mg/l in order to prevent the accumulation of static electricity generated by friction between the aviation fuel and the inner wall of a fuel piping system, caused when the fuel flows through the system at high velocities and to enhance the electric conductivity.

The metal deactivator such as N,N-disalicylidene-1,2-propanediamine may be added not exceeding 5.7 mg/l such that a fuel will not lose stability by the reaction of free metal components contained therein.

The anti-icing agent such as ethylene glycol monomethylether may be added in an amount of 0.1 to 0.15 percent by volume in order to prevent a slight amount of water contained in an aviation fuel from freezing and plugging pipes.

The aviation fuel composition of the present invention may be appropriately blended with optional additives such as an antistatic additive, a corrosion inhibitor and a fungicide to an extent that the scope of the present invention is not deviated.

The aviation fuel composition of the present invention satisfies the standard of JIS K2209 "Aviation Turbine Fuels".

The density at 15° C. of the aviation fuel composition of the present invention is preferably 775 kg/cm$^3$ or higher, more preferably 780 kg/cm$^3$ or higher in view of fuel consumption rate. Whereas, the density is preferably 839 kg/cm$^3$ or lower, more preferably 830 kg/cm$^3$ or lower, more preferably 820 or lower in view of combustibility.

The density at 15° C. referred herein denotes a value measured in accordance with JIS K 2249 "Crude Oil and Petroleum Products-Determination of density and petroleum measurement tables based on reference temperature (15° C.)".

With regard to the distillation characteristics of the aviation fuel composition of the present invention, the 10 vol. % distillation temperature is preferably 204° C. or lower, more preferably 200° C. or lower in view of evaporation characteristics. The end point is preferably 300° C. or lower, more preferably 290° C. or lower, more preferably 280° C. or lower in view of combustion characteristics (burn-out characteristics).

The distillation characteristics referred herein denotes values measured in accordance with JIS K 2254 "Petroleum products-Determination of distillation characteristics".

The existent gum content of the aviation fuel composition of the present invention is preferably 7 mg/100 ml or less, more preferably 5 mg/100 ml or less, more preferably 3 mg/100 ml or less with the objective of preventing malfunctions due to deposit formation in a fuel intake system.

The existing gum referred herein denotes a value measured in accordance with JIS K2261 "Motor gasoline and aviation fuels-Determination of existent gum".

The net heating value of the aviation fuel composition of the present invention is preferably 42.8 MJ/kg or greater, more preferably 45 MJ/kg or greater in view of fuel consumption rate. The net heating value referred herein denotes a value measured in accordance with JIS K 2279 "Crude Oil and petroleum products-Determination of heat of combustion".

The kinematic viscosity at −20° C. of the aviation fuel composition of the present invention is preferably 8 mm$^2$/s or less, more preferably 7 mm$^2$/s or less, more preferably 5 mm$^2$/s or less in view of flowability in fuel piping and with the objective of accomplishing the uniform fuel injection. The kinematic viscosity referred herein denotes a value measured in accordance with JIS K 2283 "Crude petroleum and petroleum products-Determination of kinematic viscosity".

The copper plate corrosion of the aviation fuel composition of the present invention is preferably 1 or less in view of the corrosiveness of a fuel tank or piping. The copper plate corrosion referred herein denote a value measured in accordance with JIS K2513 "Petroleum Products-Corrosiveness to copper-copper strip test".

The aromatic content of the aviation fuel composition of the present invention is preferably 25 percent by volume or less, more preferably 20 percent by volume or less in view of combustibility (prevention of soot generation). The aromatic content referred herein denotes a value measured in accordance with JIS K2536 "Liquid petroleum products-Testing method of components (Fluorescent Indicator Adsorption Method)".

The smoke point of the aviation fuel composition of the present invention is preferably 25 mm or higher, more preferably 27 mm or higher, more preferably 30 mm or higher in view of combustibility (prevention of soot generation). The smoke point referred herein denotes a value measured in accordance with JIS K2537 "Petroleum products-Kerosene and aviation turbine fuels-Determination of smoke point".

The sulfur content of the aviation fuel composition of the present invention is preferably 0.3 percent by mass or less, more preferably 0.2 percent by mass or less, more preferably 0.1 percent by mass or less in view of corrosiveness. Also in view of corrosiveness, the mercaptan sulfur content is preferably 0.003 percent by mass or less, more preferably 0.002 percent by mass or less, more preferably 0.001 percent by mass or less. The sulfur content referred herein denote a value measured in accordance with JIS K2541 "Crude Oil and Petroleum Products-Determination of sulfur content". The mercaptan sulfur content referred herein denotes a value measured in accordance with JIS K2276 "Determination of mercaptan sulfur in light and middle distillates fuels (Potentiometric Method)".

The flash point of the aviation fuel composition of the present invention is preferably 38° C. or higher, more preferably 40° C. or higher, more preferably 45° C. or higher in view of safety. The flash point referred herein denotes a value measured in accordance with JIS K2265 "Crude Oil and Petroleum Products-Determination of flash point-Tag Closed Cup Method".

The total acid value of the aviation fuel composition of the present invention is preferably 0.1 mgKOH/g or less, more preferably 0.08 mgKOH/g or less, more preferably 0.05 mgKOH/g or less in view of corrosiveness. The total acid value referred herein denotes a value measured in accordance with JIS K2276 "Determination of the Total Acid Value".

The freezing point of the aviation fuel composition of the present invention is preferably −47° C. or lower, more preferably −48° C. or lower, more preferably −50° C. or lower with the objective of preventing a reduction in fuel supply caused by fuel freezing when being exposed to low temperatures during flight. The freezing point referred herein denotes a value measured in accordance with JIS K 2276 "Determination of the freezing point of aviation fuels".

The thermal stability of the aviation fuel composition of the present invention is preferably 10.1 kPa or less in pressure difference and less than 3 in a preheating tube deposit evaluation value in A method, and 3.3 kPa or less in pressure difference and less than 3 in a preheating tube deposit evaluation value in B method with the objective of preventing clogging of a fuel filter caused by deposit formation when being exposed to high temperatures. The thermal stability referred herein denotes the values measured in accordance with JIS K2276 "Determination of thermal oxidation stability of gas turbine fuels-JFTOT method Method A, Method B".

The water solubility of the aviation fuel composition of the present invention is preferably 2 or less in a separated state and 1b or less in an interfacial state with the objective of preventing the occurrence of troubles caused by deposition of dissolved water when exposed to low temperatures. The water solubility referred herein denotes the values measured in accordance with JIS K 2276 "Determination of the water reaction of aviation fuels".

The aviation fuel base oil and aviation fuel composition, containing an environment friendly base oil produced from a feedstock that is an animal or vegetable fat, of the present invention are excellent all in combustibility, oxidation stability, and life cycle $CO_2$ characteristics.

EXAMPLES

The present invention will be described in more details with reference to the following examples but is not limited thereto.

(Preparation of Catalyst)

<Catalyst A>

To 3000 g of a 5 mass % sodium aluminate aqueous solution was added 18.0 g of sodium silicate No. 3. The resulting mixture was placed into a vessel kept at a temperature of 65° C. Separately to this, in another vessel kept at a temperature of 65° C., a solution was prepared by adding 6.0 g of phosphoric acid (85% concentration) to 3000 g of a 2.5 mass % aluminum sulfate aqueous solution. To the solution was added dropwise the aqueous solution containing sodium aluminate produced above. The dropwise addition was terminated when the pH of the mixed solution reached 7.0. The resulting slurry product was passed through a filter thereby producing a cake-like slurry.

The resulting cake-like slurry was transferred to a vessel equipped with a reflux condenser, and 150 ml of distilled water and 10 g of a 27% ammonia aqueous solution were added thereto, followed by heating and stirring at a temperature of 75° C. for 20 hours. The resulting slurry was placed in a kneader and kneaded while being heated to a temperature of 80° C. or higher to remove moisture thereby producing a clay-like kneaded product. The resulting kneaded product was extruded into a cylinder shape having a diameter of 1.5 mm through an extruder, dried at a temperature of 110° C. for one hour and then calcined at a temperature of 550° C. thereby producing a molded support.

Into an eggplant-type flask was placed 50 g of the resulting molded support, and also poured an impregnation solution containing 17.3 g of molybdenum trioxide, 13.2 g of nickel (II) nitrate hexahydrate, 3.9 g of phosphoric acid (85% concentration), and 4.0 g of malic acid while deaerating with a rotary evaporator. After dried at a temperature of 120° C. for one hour, the impregnated sample was calcined at a temperature of 550° C. thereby producing Catalyst A. The physical properties of Catalyst A are set forth in Table 1 below.

<Catalyst B>

Into an eggplant-type flask was placed 50 g of a commercially available silica alumina support (N632HN manufactured by JGC C&C), and then poured an aqueous solution of tetraammineplatinum (II) chloride while deaerating with a rotary evaporator. The impregnated sample was dried at a temperature of 110° C. and then calcined at a temperature of 350° C. thereby producing Catalyst B. The amount of platinum supported on Catalyst B was 0.5 percent by mass on the basis of the total mass of the catalyst. The physical properties of Catalyst B were set forth in Table 1.

Example 1

A reaction tube (inner diameter of 20 mm) charged with Catalyst A (100 ml) was installed countercurrently in a fixed bed flow type reactor. Thereafter, Catalyst A was pre-sulfurized for 4 hours using a straight-run gas oil (3 mass % sulfur content) containing dimethyl disulfide, under conditions where the catalyst layer average temperature was 300° C., the hydrogen partial pressure was 6 MPa, the liquid hourly space velocity was 1 $h^{-1}$, and the hydrogen/oil ratio was 200 NL/L.

After the pre-sulfurization, a hydrotreated oil after being introduced into a high pressure separator described below was partially recycled to be incorporated in vegetable fat 1 having properties set forth in Table 2 (the ratio of the compound having a triglyceride structure in the oxygen-containing hydrocarbon compound: 98 mol %) so that the amount of the hydrotreated oil is one times by mass relative to vegetable fat 1. Dimethyl sulfide was added to the mixture to prepare a feedstock and to adjust the sulfur content (in terms of sulfur) thereof to be 10 ppm by mass. Thereafter, the feedstock was hydrotreated. The feedstock had a density at 15° C. of 0.900 g/ml. and an oxygen content of 11.5 percent by mass. The hydrotreatment was carried out under conditions where the temperature at the reaction tube inlet was 280° C., the hydrogen pressure was 6.0 MPa, the liquid hourly space velocity was 1.0 $h^{-1}$, and the hydrogen/oil ratio was 510 NL/L. A hydrotreated oil produced by hydrotreating the feedstock was introduced into the high pressure separator to remove hydrogen, hydrogen sulfide, carbon dioxide, and water. A portion of the hydrotreated oil after being introduced into the high pressure separator was cooled to a temperature of 40° C. with cooling water and then recycled to be mixed with the vegetable fat 1 as described above. The hydrotreated oil remaining after recycling was introduced into a fixed bed flow type reactor (isomerization unit) equipped with a reaction tube (inner diameter: 20 mm)

charged with Catalyst B to be isomerized. Before isomerization, Catalyst B was reduced for 6 hours under conditions where the catalyst layer average temperature was 320° C., the hydrogen pressure was 5 MPa, and the hydrogen gas flow rate was 83 ml/min. Thereafter, isomerization was carried out under conditions where the catalyst layer average temperature was 330° C., the hydrogen pressure was 3 MPa, the liquid hourly space velocity was 1 $h^{-1}$, and the hydrogen/oil ratio was 500 NL/L. The isomerized oil was directed to a rectification tower and then fractionally distilled into a light fraction having a boiling range of lower than 140° C., a middle fraction of 140 to 280° C., and a heavy fraction of higher than 280° C. The middle fraction was used as an aviation fuel base oil. The hydrotreating conditions and the properties of the resulting aviation fuel base oil are set forth in Tables 3 and 4, respectively.

Example 2

Hydrotreatment and isomerization were carried out in the same manner as that of Example 1 except that the feedstock contained 50 percent by volume of a petroleum-based base oil having properties set forth in Table 2 and the hydrogen pressure for the hydrotreatment was 3 MPa, thereby producing an aviation fuel base oil.

The petroleum-based base oil to be contained in the feedstock was a straight-run kerosene fraction produced by fractionally distilling a fraction produced by treating crude oil in an atmospheric distillation unit within a boiling range of 140 to 270° C. The hydrotreating conditions and the properties of the resulting aviation fuel base oil are set forth in Tables 3 and 4, respectively.

Example 3

Hydrotreatment and isomerization were carried out in the same manner as that of Example 1 except that vegetable fat 1 contained in the feedstock was changed to vegetable fat 2, and for the hydrotreating, the reaction tube inlet temperature was 360° C., the hydrogen pressure was 10 MPa, and the liquid hourly space velocity was 0.5 $h^{-1}$. The hydrotreating conditions and the properties of the resulting aviation fuel base oil are set forth in Tables 3 and 4, respectively.

Example 4

An aviation fuel composition containing 100 percent by volume of the aviation fuel base oil produced in Example 1 as set forth in Table 5 was produced.

Example 5

An aviation fuel composition as set forth in Table 5 was prepared by blending 50 percent by volume of the aviation fuel base oil of Example 1 and 50 percent by volume of an aviation fuel base oil having properties set forth in Table 2 produced by hydrodesulfurizing a fraction produced by fractionally distilling a fraction produced by treating crude oil in an atmospheric distillation unit within a boiling range of 140 to 270° C.

Example 6

An aviation fuel composition as set forth in Table 5 was prepared by blending 50 percent by volume of the aviation fuel base oil of Example 2 and 50 percent by volume of an aviation fuel base oil having properties set forth in Table 2 produced by hydrodesulfurizing a fraction produced by fractionally distilling a fraction produced by treating crude oil in an atmospheric distillation unit within a boiling range of 140 to 270° C.

Example 7

An aviation fuel composition as set forth in Table 5 was prepared by blending 50 percent by volume of the aviation fuel base oil of Example 3 and 50 percent by volume of an aviation fuel base oil having properties set forth in Table 2 produced by hydrodesulfurizing a fraction produced by fractionally distilling a fraction produced by treating crude oil in an atmospheric distillation unit within a boiling range of 140 to 270° C.

The following additives were added to the compositions of Examples 4 to 7.
antioxidant (2,6-ditertiary-butyl-phenol) 20 mass ppm
antistatic (STADIS 450) 2.0 mg/l
(General Properties of Feedstock, Aviation Fuel Base Oil and Aviation Fuel)

The general properties of the feedstock, aviation fuel base oil and aviation fuel set forth in Tables 2, 4 and 5 refer to values measured by the following methods.

The density at 15° C. (density@15° C.) refers to a value measured in accordance with JIS K2249 "Crude Oil and Petroleum Products-Determination of density and petroleum measurement tables based on reference temperature (15° C.)".

The kinematic viscosity at 30° C. or −20° C. refers to a value measured in accordance with JIS K2283 "Crude Oil and Petroleum Products-Test Methods for Kinetic Viscosity and Viscosity Index Calculation Method".

Elemental analysis C (mass %) and H (mass %) refer to values each determined by a method defined by ASTM D 5291 "Standard Test Methods for Instrumental Determination of Carbon, Hydrogen and Nitrogen in Petroleum Products and Lubricants".

The oxygen content refers to a value measured by a method such as UOP649-74 "Total Oxygen in Organic Materials by Pyrolysis-Gas Chromatographic Technique".

The sulfur content refers to a value measured in accordance with JIS K2541 "Crude Oil and Petroleum Products-Determination of sulfur content".

The mercaptan sulfur content refers to a value measured in accordance with JIS K2276 "Determination of mercaptan sulfur in light and middle distillates fuels (Potentiometric Method)".

The acid value refers to a value measured in accordance with JIS K2501 "Petroleum Products and Lubricating Oils Test Method for Neutralization Number".

The composition ratio of fatty acid groups in animal or vegetable fat refers to a value determined in accordance with the above-described Standard Methods for the Analysis of Fats, Oils and Related Materials (established by Japan Oil Chemists' Society) (1993) "2.4.21.3-77 Fatty Acid Composition (FID Temperature Programmed Gas Chromatograph Method)".

The flash point refers to a value determined in accordance with JIS K2265 Crude Oil and Petroleum Products-Determination of flash point-Tag Closed Cup Method".

The distillation characteristics refer to values measured in accordance with JIS K2254 "Petroleum products-Determination of distillation characteristics".

The aromatic content refers to a value measured in accordance with JIS K2536 "Liquid petroleum products-Testing method of components (Fluorescent Indicator Adsorption Method)".

The total acid value refers to a value measured in accordance with JIS 2276 "Determination of the Total Acid Value".

The freezing point refers to a value measured in accordance with JIS 2276 "Determination of the freezing point of aviation fuels".

The smoke point refers to a value measured in accordance with JIS K2537 "Petroleum products-Kerosene and aviation turbine fuels-Determination of smoke point".

The thermal stability refers to a value measured in accordance with JIS K2276 "Determination of thermal oxidation stability of gas turbine fuels-JETOT method Method A, Method B".

The net heating value refers to a value measured in accordance with JIS K2279 "Crude Oil and petroleum products-Determination of heat of combustion".

The copper plate corrosion (50° C., 4 hr) refers to a value measured in accordance with JIS K2513 "Petroleum Products-Corrosiveness to copper-copper strip test".

The conductivity refers to a value measured in accordance with JIS K 2276 "Petroleum product-aviation fuel oil test method-conductivity test method".

The existent gum content refers to a value measured in accordance with JIS K2261 "Motor gasoline and aviation fuels-Determination of existent gum".

The water solubility refers to a value measured in accordance with JIS K2276 "Determination of the water reaction of aviation fuels".

(Life Cycle Characteristics)

The life cycle characteristics (life cycle $CO_2$ calculation) described in the present Example were calculated by the following method.

Life cycle $CO_2$ was calculated separately as the $CO_2$ generated accompanied with the flight of an airplane using an aviation fuel (combustion of the fuel) and as the $CO_2$ generated from oil-well drilling in the fuel production to pumping to an airplane fuel tank.

The $CO_2$ generated by combustion (hereinafter referred to as "Tank to Wheel $CO_2$") was used after converted into the emissions per unit heating value using the value defined by Ministry of the Environment (jet fuel: 2.5 kg–$CO_2$/L). The $CO_2$ generated from oil-well drilling to pumping to an airplane fuel tank (hereinafter referred to as "Well to Tank $CO_2$") was calculated as the total $CO_2$ emissions during a sequence starting from the drilling of material and crude oil resources, through transportation, processing, and delivery, to pumping to an airplane's fuel tank. For calculation of "Well to Tank $CO_2$", the calculation was carried out in consideration of the carbon dioxide generated during the following (1B) to (5B) events. Data required for the calculation was the oil refinery operation performance date possessed by the inventors of the present invention.

(1B) Carbon dioxide emissions accompanied with the use of fuel for various processing devices and facilities such as boilers (2B) Carbon dioxide emissions accompanied with reforming reaction in a hydrogen producing device in a processing using hydrogen (3B) Carbon dioxide emissions accompanied with regeneration of a catalyst if the processing is carried out through a device such as a catalytic cracking device requiring continuous catalyst regeneration (4B) Carbon dioxide emissions when a gas oil composition was produced or shipped at Yokohama, Japan, delivered therefrom to Sendai, Japan, and pumped into a vehicle there (5B) Carbon dioxide emissions when an animal or vegetable fat and a component originating therefrom were obtained from Malaysia or regions therearound, and a gas oil composition was produced in Yokohama, Japan.

If an animal or vegetable fat and a component originating therefrom is used as fuel, a rule established in Kyoto Protocol that the carbon dioxide emissions resulting from combustion of such fuel is not counted is applied. This rule was thus applied to the above-described "Tank to Wheel $CO_2$" calculation.

As apparent from Table 5, the aviation fuels containing an aviation fuel base oil produced by hydrotreating a feedstock originating from an animal or vegetable fat have general properties that are comparable with those of a typical petroleum-based aviation fuel while they are excellent in life cycle characteristics and can be novel aviation fuels alternative to petroleum-based fuel, which contribute to the prevention of global warming.

TABLE 1

|  | Catalyst A | Catalyst B |
|---|---|---|
| Content $Al_2O_3$ (mass %, based on support mass) | 91.2 | 100 |
| Content $SiO_2$ (mass %, based on support mass) | 4.8 | 0 |
| Content $P_2O_5$ (mass %, based on support mass) | 4.0 | 0 |
| Content $MoO_3$ (mass %, based on catalyst mass) | 24.0 | 0 |
| Content NiO (mass %, based on catalyst mass) | 2.6 | 0 |
| Content Pt (mass %, based on catalyst mass) | 0 | 0.5 |
| Pore Volume (ml/g) | 0.75 | 0.47 |
| Average Pore diameter (nm) | 7.0 | 5.2 |
| Ratio of Pore Volume derived from Pores having a pore diameter of 3 nm or less to Total Pore Volume (% by volume) | 22 | 39 |

TABLE 2

|  |  | Vegetable Fat 1 (coconut oil) | Vegetable Fat 2 (palm oil) | Petroleum-based Base Oil | Aviation Fuel Base Oil |
|---|---|---|---|---|---|
| Density at 15° C. (kg/m³) | | 900 | 916 | 792 | 790 |
| Kinematic viscosity at 30° C. (mm²/s) | | — | — | 1.4 | 1.3 |
| Elemental Analysis | C (mass %) | 77.0 | 77.3 | 85.2 | 85.0 |
| | H (mass %) | 12.0 | 12.0 | 13.3 | 15.0 |
| Oxygen Content (mass %) | | 11.5 | 10.6 | <0.1 | <0.1 |
| Sulfur Content (mass %) | | <1 | <1 | 1.15 | 0.05 |
| Acid Value (mgKOH/g) | | 0.10 | 0.07 | 0.00 | 0.00 |
| Component Ratio (mass %) of Fatty Acid Groups in Fat (number of carbon atoms in fatty acid carbon chain) | Butyric acid group (C3) | 0 | 0 | — | — |
| | Caproic acid group (C5) | 0 | 0 | — | — |
| | Caprylic acid group (C7) | 4 | 0 | — | — |
| | Capric acid group (C9) | 4 | 0 | — | — |
| | Lauric acid group (C11) | 49 | 0 | — | — |

TABLE 2-continued

|  | Vegetable Fat 1 (coconut oil) | Vegetable Fat 2 (palm oil) | Petroleum-based Base Oil | Aviation Fuel Base Oil |
|---|---|---|---|---|
| Myristic acid group (C13) | 17 | 1 | — | — |
| Palmitic acid group (C14) | 9 | 44 | — | — |
| Stearic acid group (C16) | 3 | 5 | — | — |
| Oleic acid group (C17) | 7 | 39 | — | — |
| Linoleic acid group (C17) | 2 | 10 | — | — |
| Linolenic acid group (C17) | 0 | 0 | — | — |

TABLE 3

|  |  | Example 1 | Example 2 | Example 3 |
|---|---|---|---|---|
| Recycled Amount | times by mass | 1 | 1 | 1 |
| Reaction Temperature (Temperature at Reaction Tube Inlet) | °C. | 280 | 280 | 360 |
| Hydrogen Pressure | MPa | 6 | 3 | 10 |
| LHSV | h$^{-1}$ | 1.0 | 1.0 | 0.5 |
| With or Without Quenching |  | Yes | Yes | Yes |
| Amount of Addition of Sulfur-Containing Hydrocarbon Compound (to Feedstock) | ppm by mass | 10 | 10 | 10 |

TABLE 4

|  |  | Example 1 | Example 2 | Example 3 |
|---|---|---|---|---|
| Density at 15° C. | g/cm$^3$ | 0.750 | 0.771 | 0.780 |
| Flash Point | °C. | 85 | 64 | 75 |
| Distillation Characteristics |  |  |  |  |
| T10 | °C. | 202.0 | 185.0 | 149.5 |
| T50 | °C. | 225.0 | 210.5 | 168.0 |
| T90 | °C. | 238.0 | 236.5 | 254.0 |
| EP | °C. | 258.0 | 259.0 | 273.5 |
| Sulfur Cntent | mass ppm | <1 | 5 | <1 |
| Aromatic Content | vol % | 0 | 9 | 0 |
| Total Acid Value | mgKOH/g | 0.00 | 0.01 | 0.00 |
| Freezing Point | °C. | −47 | −45 | −40 |
| Smoke Point | mm | >50 | 40 | 35 |
| Thermal Oxidation Stability |  |  |  |  |
| Filter Pressure Difference | kPa | 0 | 0 | 0 |
| Tube Rating |  | <1 | <1 | <1 |
| Life Cycle Characteristics (W to W—CO$_2$ emissions) | g-CO$_2$/MJ | 40.4 | 53.8 | 50.0 |

TABLE 5

|  |  | Example 4 | Example 5 | Example 6 | Example 7 | (Reference Example) Typical Petroleum-based Aviation Fuel |
|---|---|---|---|---|---|---|
| Density at 15° C. | g/cm$^3$ | 0.750 | 0.770 | 0.781 | 0.785 | 0.788 |
| Flash Point | °C. | 85 | 65 | 58 | 60 | 46 |
| Distillation Characteristics |  |  |  |  |  |  |
| T10 | °C. | 202.0 | 180.0 | 173.5 | 152.0 | 166.5 |
| T50 | °C. | 225.0 | 210.0 | 200.0 | 177.5 | 191.5 |
| T90 | °C. | 238.0 | 235.5 | 238.0 | 245.0 | 231.5 |
| EP | °C. | 258.0 | 260.0 | 262.0 | 265.0 | 251.5 |
| Sulfur Cntent | mass ppm | <1 | 3 | 5 | 2 | 4 |
| Mercaptan Sulfur Content |  | 0 | <0.001 | <0.001 | <0.001 | <0.001 |
| Aromatic Content | vol % | 0 | 8 | 12 | 9 | 17 |
| Total Acid Value | mgKOH/g | 0.00 | 0.01 | 0.01 | 0.01 | 0.01 |
| Freezing Point | °C. | −47 | −48 | −48 | −47 | −49 |
| Smoke Point | mm | >50 | 42 | 33 | 28 | 25 |
| Kinematic Viscosity (@−20° C.) | mm$^2$/s | 4.48 | 4.51 | 4.65 | 3.66 | 3.38 |
| Net Heating Value | MJ/kg | 46.9 | 46.7 | 46.6 | 46.5 | 43.4 |
| Corrosiveness to Copper (50° C. 4 hr) |  | 1 | 1 | 1 | 1 | 1 |
| Conductivity | pS/m | 220 | 200 | 250 | 230 | 210 |
| Existent Gum Content | mg/100 ml | <1 | <1 | <1 | <1 | <1 |
| Water Reaction |  |  |  |  |  |  |
| Separated State |  | 1 | 1 | 1 | 1 | 1 |
| Interfaicial State |  | 1b | 1b | 1b | 1b | 1b |
| Thermal Oxidation Stability |  |  |  |  |  |  |
| Filter Pressure Difference | kPa | 0 | 0 | 0 | 0 | 0 |
| Tube Rating |  | <1 | <1 | <1 | <1 | <1 |
| Life Cycle Characteristics (W to W—CO$_2$ emissions) | g-CO$_2$/MJ | 40.4 | 60.2 | 66.9 | 65.0 | 81.3 |

INDUSTRIAL APPLICABILITY

The present invention provides an environment friendly aviation fuel base oil having excellent combustibility, oxidation stability and lifecycle properties resulting from its neutral carbon properties and can contribute to primary energy diversification and also an aviation fuel composition comprising the base oil.

The invention claimed is:

1. An aviation fuel base oil produced by hydrotreating a feedstock comprising a mixed oil of an oxygen-containing hydrocarbon compound originating from an animal or vegetable fat and a sulfur-containing hydrocarbon compound which is selected from the group consisting of sulfide, disulfide, polysulfide, thiol, thiophene, benzothiophene, dibenzothiophene and derivatives thereof or a feedstock comprising said mixed oil and a petroleum base oil produced by refining crude oil,
 - wherein the feedstock further comprises a recycled oil in an amount of 0.5 to 5 times by mass of the oxygen-containing hydrocarbon compound originating from an animal or vegetable fat,
 - wherein the feedstock contains sulfur in an amount of 1 to 50 ppm by mass in terms of sulfur on the basis of the total mass of the feedstock, and,
 - wherein the hydrotreating comprises steps (a) and (b):
 - step (a): hydrotreating the feedstock in the presence of hydrogen using a catalyst to produce a hydrotreated oil, wherein the catalyst comprises a porous inorganic oxide comprising two or more types of elements selected from aluminum, silicon, zirconium, boron, titanium and magnesium and one or more types of metals selected from the group consisting of the Groups 6A and 8 elements of the periodic table, supported thereon, under conditions where the hydrogen pressure is from 2 to 13 MPa, the liquid hourly space velocity is from 0.1 to 3.0 $h^{-1}$, the hydrogen/oil ratio is from 150 to 1500 NL/L and the reaction temperature is from 150 to 480° C.; and
 - step (b): isomerizing the hydrotreated oil produced in step (a) in the presence of hydrogen using a catalyst comprising a porous inorganic oxide comprising a substance selected from aluminum, silicon, zirconium, boron, titanium, magnesium and zeolite and one or more types of metals selected from the group consisting of the Group 8 elements of the periodic table, supported thereon, under conditions where the hydrogen pressure is from 2 to 13 MPa, the liquid hourly space velocity is from 00.1 to 3.0 $h^{-1}$, the hydrogen/oil ratio is from 250 to 1500 NL/L, and the reaction temperature is from 150 to 380° C.,
 - wherein the recycled oil contains a portion of the hydrotreated oil produced in step (a), and wherein the portion is produced by removing water, carbon monoxide, carbon dioxide, and hydrogen sulfide from the hydrotreated oil.

2. An aviation fuel composition comprising the aviation fuel base oil according to claim 1.

3. An aviation fuel composition comprising the aviation fuel base oil according to claim 1, and an aviation fuel base oil produced by refining crude oil.

4. The aviation fuel composition according to claim 2, further comprising one or more additives selected from an anti-oxidant, an antistatic, a metal deactivator, and an anti-icing agent.

5. The aviation fuel composition according to claim 2, wherein the composition satisfies the standard defined by JIS K2209 "Aviation turbine fuels".

6. The aviation fuel base oil according to claim 1, wherein the Group 8 element in step (b) is selected from the group consisting of Pd, Pt, Rh, Ir and Ni.

* * * * *